United States Patent [19]

Miyazawa et al.

[11] Patent Number: 4,924,167
[45] Date of Patent: May 8, 1990

[54] ROTOR MOVEMENT WARNING DEVICE FOR USE IN STEPPER MOTORS

[75] Inventors: Yuzo Miyazawa; Koichi Nakamura, both of Yamatokoriyama, Japan

[73] Assignee: Sharp Kabushiki Kaisha, Osaka, Japan

[21] Appl. No.: 288,132

[22] Filed: Dec. 22, 1988

[30] Foreign Application Priority Data

Dec. 25, 1987 [JP] Japan ............................ 62-197777[U]

[51] Int. Cl.$^5$ ................................................ H02P 8/00
[52] U.S. Cl. ...................................... 318/696; 318/685
[58] Field of Search ................................ 318/696, 685

[56] References Cited

U.S. PATENT DOCUMENTS 4,536,691  8/1985  Sakakibara ........................... 318/696
4,769,585  9/1988  Tanuma et al. ...................... 318/696

Primary Examiner—William M. Shoop, Jr.
Assistant Examiner—Saul M. Bergmann

[57] ABSTRACT

A rotor movement warning device for use in a stepper motor has a stator provided with a plurality of windings and a rotor rotatably provided in associated with said stator. The rotor movement warning device includes a power source, a plurality of switching transistors provided in association with the plurality of windings, respectively, for controlling power supply from the power source to the windings, and a driving pulse producer for producing driving pulses to the plurality of switching transistors for effecting the rotation of the rotor. Further provided are detector for detecting, when the rotor stops, at least one switching transistor which is provided with the last driving pulse, and low frequency signal producer for producing low frequency signals which are applied to the switching transistor detected by the detector.

11 Claims, 3 Drawing Sheets

ROTOR MOVEMENT WARNING DEVICE FOR USE IN STEPPER MOTORS

BACKGROUND OF THE INVENTION

1. Field of the Invention

The present invention relates to a stepper motor and, more particularly, to a rotor movement warning device for warning the user not to rotate the rotor when the stepper motor is in the stand-by position.

2. Description of the Prior Art

The stepper motor is a motor which rotates in short and essentially uniform angular movements rather than continuously. The angular movement is determined by the number of driving pulses applied to the stepper motor. Unlike the synchronous induction motor, the stepper motor can change the direction of the rotation by the change of exciting sequence of the windings in different phases. Also, the stepper motor differs from the two-phase servo motor such that the stepper motor does not require a closed loop control system, but requires an open loop control system, for the position detection. Also, in a stepper motor, the synchronizing force functions as a recovering force.

Therefore, in general, the stepper motor is driven by the open loop control system by counting the number of driving pulses applied to the stepper motor. When the stepper motor stops, taking a stand-by position ready for the further rotation, one or more windings in the particular phase or phases are applied with a constant current for generating a holding torque to maintain the rotor in the rotated position.

The step motor is used in various electric appliances, such as in a printer for moving the printer head. In such a case, an operator may try to forcibly move the printer head, resulting in undesirable displacement of the system. For example, during the exchange of the ink ribbon cassette or a printer wheel, an operator may forcibly shift the printer head which carries these ink ribbon cassette and the printer wheel to a position easy to do the exchange. When the force applied by the operator exceeds the holding torque of the stepper motor, the rotor of the stepper motor rotates without using any driving pulse. In such a case, the printer head will be shifted to a position which does not coincide with the location traced by counting the number of driving pulses.

SUMMARY OF THE INVENTION

The present invention has been developed with a view to substantially solving the above described disadvantages and has for its essential object to provide a rotor movement warning device which produces a warning signal when someone tries eventually to forcibly rotate the stepper motor rotor.

According to the present invention, a rotor movement warning device for use in a stepper motor has a stator provided with a plurality of windings and a rotor rotatably provided in association with the stator. The rotor movement warning device comprises a power source, a plurality of switching transistors provided in association with the plurality of windings, respectively, for controlling power supply from the power source to the windings, and a driving pulse producer for producing driving pulses to the plurality of switching transistors for effecting the rotation of the rotor. According to the present invention, a detector is further provided for detecting when the rotor stops. At least one switching transistor is provided with the last driving pulse, and low frequency signal producer for producing low frequency signals which are applied to the switching transistor detected by the detector.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
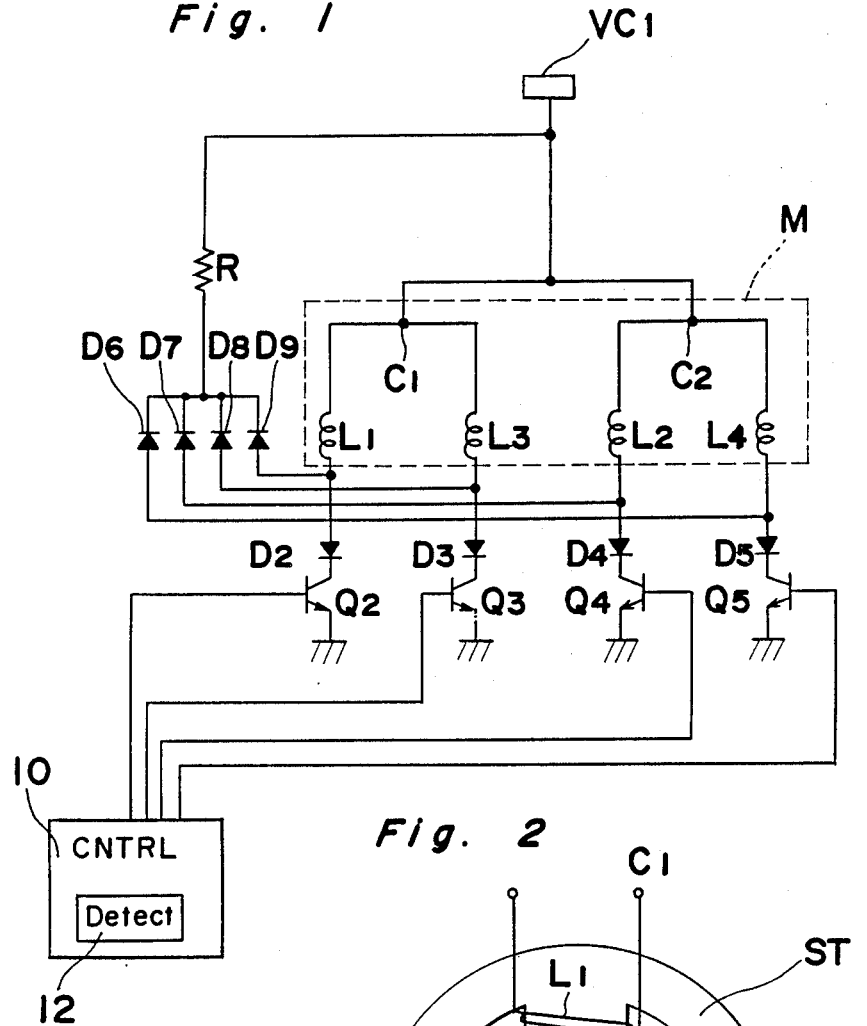
FIG. 1 is a circuit diagram of a stepper motor provided with a rotor movement warning device according to a first embodiment of the present invention.
Figure 2:
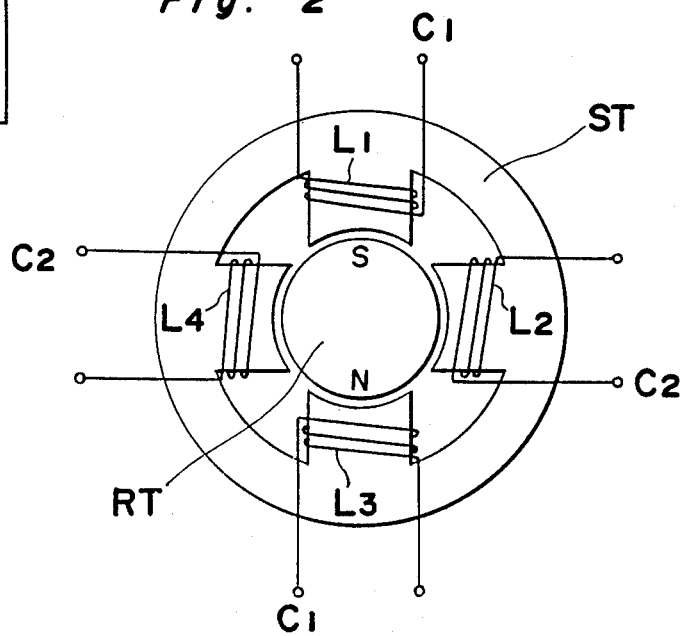
FIG. 2 is a diagrammatic view of a stepper motor provided in association with the circuit of FIG. 1.

Referring to FIG. 1, a four phase stepper motor M is shown having four windings L1, L2, L3 and L4. As shown in FIG. 2, windings L1, L2, L3 and L4 are mounted on four poles provided in the stator ST. A rotor RT is a permanent magnet having a north pole N and a south pole S. One end of each of windings L1 and L3 is connected to a junction C1 and further to a voltage source VC1, and other end of each of the windings L1 and L3 are connected to diodes D2 and D3, respectively. Similarly, one end of each of the windings L2 and L4 is connected to a junction C2 and further to voltage source VC1, and other end of each of the windings L2 and L3 are connected to diodes D4 and D5, respectively. Diodes D2, D3, D4 and D5 are further connected, respectively, through phase control switching transistors Q2, Q3, Q4 and Q5 to the ground. The bases of the transistors Q2, Q3, Q4 and Q5 are connected to a control 10. Diodes D6, D7, D8 and D9 are provided for protecting the switching transistors Q2, Q3, Q4 and Q5, and resistor R is for the protection resistor.

The operation of the stepper motor shown in FIGS. 1 and 2 will be described hereinbelow.

Figure 3:
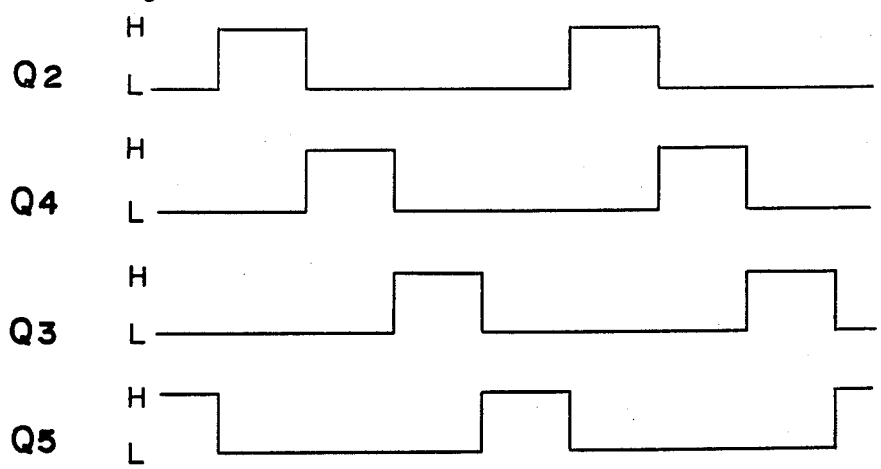
FIG. 3 is a graph showing waveforms of driving pulses applied to the stepper motor of FIG. 1.
Figures 4A, 4B, 4C:
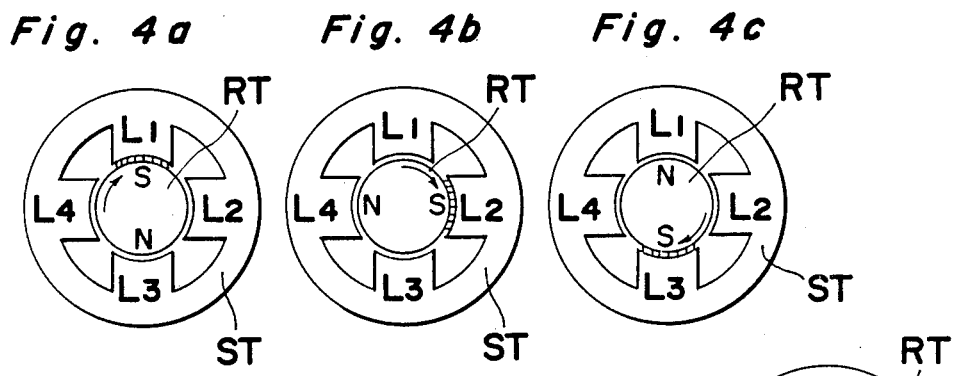
FIGS. 4a to 4d are diagrammatic views showing operation of the stepper motor.
Figure 4D:
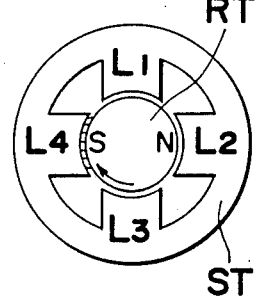
Figure 5:
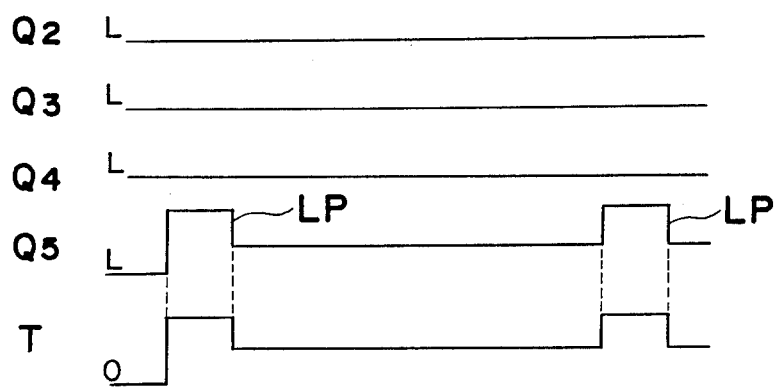
FIG. 5 is a graph showing waveforms of warning pulses applied to the stepper motor of FIG. 1.

To rotate the rotor RT according to one phase driving method, high level driving pulses, as shown in FIG. 3, are applied from control 10 sequentially to switching transistors Q2, Q4, Q3 and Q5 so that windings L1, L2, L3 and L4 are excited in said order. Thus, as shown in FIGS. 4a, 4b, 4c and 4d, rotor RT rotates in clockwise direction. When the rotor RT stops, for example at the position shown in FIG. 4d, a detector 12 provided in control 10 detects that the last driving pulse is applied to transistor Q5 to excite winding L4. Then, to keep the rotor in the stopped position, control 10 provides a holding signal, which is a combination of a continuous high level signal carrying low frequency pulses LP (about 20 Hz) thereon, to the transistor provided with the last driving pulse, i.e., transistor Q5 in the above example. By the high level signal applied to transistor Q5, winding L4 produces a certain amount of holding torque to the rotor RT and, at the same time, by the low frequency pulses LP, the holding torque T is periodically enhanced.

Accordingly, if the operator tries to forcibly rotate the rotor RT, for example, by trying to move an object (not shown) driven by the stepper motor, he will feel the pulsating force (20 Hz) which will warn him not to move the object. Thus, the rotor is kept in the stopped position. In this manner, the operator receives a warning that he should not try to move the object.

According to one preferred embodiment, the low frequency pulse LP should have a duty ratio of 1:5.

Also, the holding signal may be a combination of a continuous low level signal carrying low frequency pulses LP thereon. In such a case, the holding torque T is produced periodically, i.e, no holding torque is produced during the intervals between the low frequency pulses LP. This is sufficient in the case where the object to be driven can not be easily shifted by a slight pushing force.

Furthermore, in the case where the two phase driving method (neighboring two windings such as L1 and L2, are simultaneously excited, instead of one winding such as L1) is employed, detector 12 detects two transistors (such as Q2 and Q4) to which the two last driving pulses are applied. Then, the holding signals are applied to those two transistors, simultaneously, from control 10.

Figure 6:
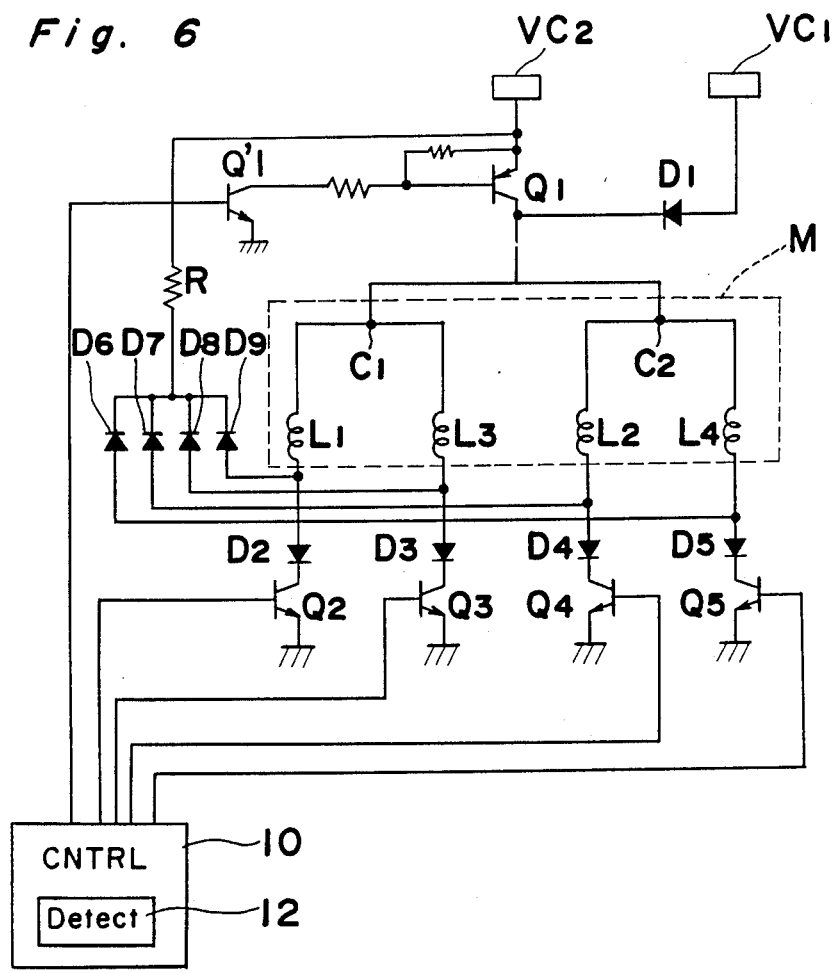
FIG. 6 is a circuit diagram of a stepper motor provided with a rotor movement warning device according to a second embodiment of the present invention.
Figure 7:
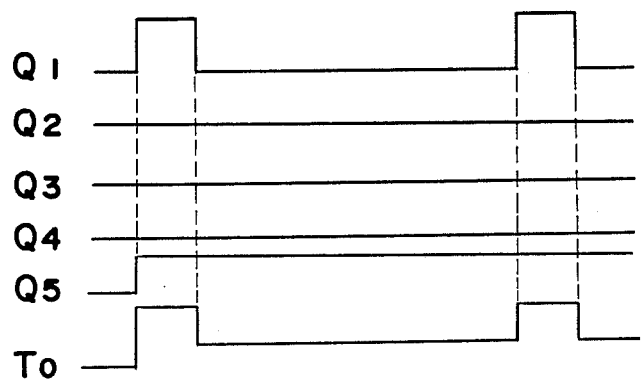
FIG. 7 is a graph showing waveforms of warning pulses applied to the stepper motor of FIG. 7.

Referring to FIG. 6, a second embodiment of the present invention is shown. When compared with the first embodiment of FIG. 1, the second embodiment further has a diode D1 inserted in a line extending from voltage source VC1. Further provided is an auxiliary voltage source VC2 connected through a switching transistor Q1 to junctions C1 and C2. The base of transistor Q1 is connected through a suitable resistor to transistor Q1' and further to control 10.

In operation, according to one phase driving method, control 10 provides continuously a low level signal to transistor Q1, and at the same time, control 10 provides sequential pulses such as shown in FIG. 3 to transistors Q2, Q3, Q4 and Q5 to effect the clockwise rotation of the rotor RT by the power supplied from voltage source VC1. Then, when the rotor RT stops, detector 12 detects the transistor that was provided with the last driving pulse. For example, it is assumed that transistor Q5 is provided with the last driving pulse, meaning that the rotor RT is stopped in the position identical to that shown in FIG. 4d. Then, to keep the rotor in the stopped position, control 10 provides a holding signal, which in this embodiment is a continuous high level signal, to the transistor provided with the last driving pulse, i.e., transistor Q5 in the above example, and at the same time, low frequency pulses PL are applied to transistor Q1'. Thus, by the high level signal applied to transistor Q5, winding L4 produces a certain amount of holding torque to the rotor RT and, at the same time, by the low frequency pulses LP applied to transistor Q1', transistor Q1 turns on during the presence of pulses LP. Thus, the holding torque T is periodically enhanced by the auxiliary voltage source VC2.

In the case where the two phase driving method is employed, detector 12 detects two transistors (such as Q2 and Q4) to which the two last driving pulses are applied. Then, the holding signals are applied to those two transistors, simultaneously, from control 10.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A rotor movement warning device for use in a stepper motor having a stator provided with a plurality of windings and a rotor rotatably provided in association with said stator, said rotor movement warning device comprising:

a power source;
a plurality of switching means provided in association with said plurality of windings, respectively, for controlling the power supplied from said power source to said windings;
driving pulse producing means for producing driving pulses to said plurality of switching means for effecting the rotation of said rotor;
detecting means for detecting, when said rotor stops, at least one switching means that is provided with the last driving pulse; and
low frequency signal producing means for producing low frequency signals which are applied to only said switching means detected by said detecting means;
said low frequency signals warning an operator that movement of said rotor should not be undertaken.

2. A rotor movement warning device as claimed in claim 1, further comprising holding signal producing means for producing a holding signal which is applied to said switching means detected by said detecting means.

3. A rotor movement warning device as claimed in claim 1, wherein said low frequency signal has a frequency of approximately 20 Hz.

4. A rotor movement warning device for use in a stepper motor having a stator provided with a plurality of windings and a rotor rotatably provided in association with said stator, said rotor movement warning device comprising:

a first power source;
a plurality of switching means provided in association with said plurality of windings, respectively, for controlling power supply from said first power source to said windings;
a second power source;
a power switching means provided in association with said second power source for controlling the power supplied from said second power source to said windings;
driving pulse producing means for producing driving pulses to said plurality of switching means for effecting the rotation of said rotor;
detecting means for detecting, when said rotor stops, at least one switching means that is provided with the last driving pulse;
holding signal producing means for producing a holding signal only to the detected switching means detected by said detecting means; and
low frequency signal producing means for producing low frequency signals which are applied to said power switching means and thereby supplied only to said detected switching means.

5. A method of driving a stepper motor to rotate said motor to provide movement to an attached structure, said stepper motor including a stator having a plurality of windings and a rotor rotating with respect to said stator, the method comprising:

selectively supplying driving pulses to said windings of said motor to drive the attached structure to a desired position;

warning an operator not to move said attached structure by supply low frequency warning pulses to said windings, said low frequency warning pulses supplying a pulsating force to said attached structure to warn the operator not to move said structure from said desired position.

6. The method of claim 5 wherein said step of selectively supplying is performed by driving means for sequentially supplying drive pulses, in turn, to each of said plurality of windings, said driving means including, a power source;

a plurality of switching means provided in association with said plurality of windings, respectively, for controlling the power supplied from said power source to said windings;

driving pulse producing means for producing driving pulses to said plurality of switching means for effecting the rotation of said rotor;

detecting means for detecting, when said rotor stops, at least one switching means that is provided with the last driving pulse; and low frequency signal producing means for producing low frequency signals which are applied to only said switching means detected by said detecting means;

said low frequency signals warning an operator that movement of said rotor should not be undertaken.

7. The method of claim 6 wherein said step of warning is performed by low frequency warning pulse supply means.

8. The method of claim 5 wherein said warning pulses are superimposed over a constant low voltage, said warning pulses having a voltage less than the voltage of said driving pulses.

9. The method of claim 8 wherein said warning pulses have a frequency of about 20 Hz.

10. The method of claim 5 wherein said step of warning supplies said low frequency warning pulses only to said winding which was last driven by said step of driving.

11. The method of claim 5 further comprising detecting which winding was last driven prior to reaching said desired position during said step of selectively supplying;

said step of warning supplying said warning pulses only to the last driven winding detected by said of warning.

* * * * *